(12) United States Patent
Hernandez et al.

(10) Patent No.: US 10,407,013 B1
(45) Date of Patent: Sep. 10, 2019

(54) RADIATOR CORE STONE GUARD

(71) Applicants: DENSO International America, Inc., Southfield, MI (US); DENSO CORPORATION, Kariya, Aichi-pref. (JP)

(72) Inventors: Mario Zeron Hernandez, Royal Oak, MI (US); Jeffrey Basinski, Grand Blanc, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/038,776

(22) Filed: Jul. 18, 2018

(51) Int. Cl.
*B60R 19/52* (2006.01)

(52) U.S. Cl.
CPC ........ *B60R 19/52* (2013.01); *B60R 2019/525* (2013.01)

(58) Field of Classification Search
CPC ... B60R 19/52; B60R 2019/525; B60R 19/56; B60R 19/54; B60R 19/46
USPC ....................................... 180/68.6
See application file for complete search history.

(56) References Cited

U.S. PATENT DOCUMENTS

| | | |
|---|---|---|
| 1,431,595 A | 10/1922 | Peacock |
| 1,475,062 A | 11/1923 | Fulk |
| 1,496,661 A | 6/1924 | Dreier |
| 1,533,982 A | 4/1925 | Firkins |
| 1,715,762 A | 6/1929 | Kerbs |
| 1,777,210 A | 9/1930 | Lebherz |
| 1,855,492 A | 4/1932 | Shaw |
| 1,908,331 A | 5/1933 | Ehramjian |
| 1,959,953 A | 5/1934 | Green |
| 1,988,728 A | 1/1935 | Green |
| 2,007,529 A | 7/1935 | Green |
| 2,054,538 A | 9/1936 | Graves et al. |
| 2,127,931 A | 8/1938 | Osten |
| 2,314,600 A | 3/1943 | Reyburn |
| 2,564,153 A | 8/1951 | Comeau |
| 3,149,667 A | 9/1964 | Astrup |
| 3,249,507 A | 5/1966 | Gondoin et al. |
| 3,275,072 A | 9/1966 | Suchomel |
| 3,863,728 A * | 2/1975 | Mittendorf ............. B60K 11/04 180/68.6 |
| 2005/0029028 A1 | 2/2005 | Steinmacher |
| 2006/0125288 A1 | 6/2006 | Cheng |

* cited by examiner

*Primary Examiner* — Paul N Dickson
*Assistant Examiner* — Hilary L Johns
(74) *Attorney, Agent, or Firm* — Harness, Dickey & Pierce, P.L.C.

(57) ABSTRACT

A stone guard for protecting a radiator core of a radiator. The stone guard includes a grate, a first mount, and a second mount. The first mount is at a first end of the grate for mounting the stone guard to the radiator. The second mount is at a second end of the grate for mounting the stone guard to the radiator. A distance between the first mount and the second mount is variable to fit the stone guard to the radiator.

12 Claims, 8 Drawing Sheets

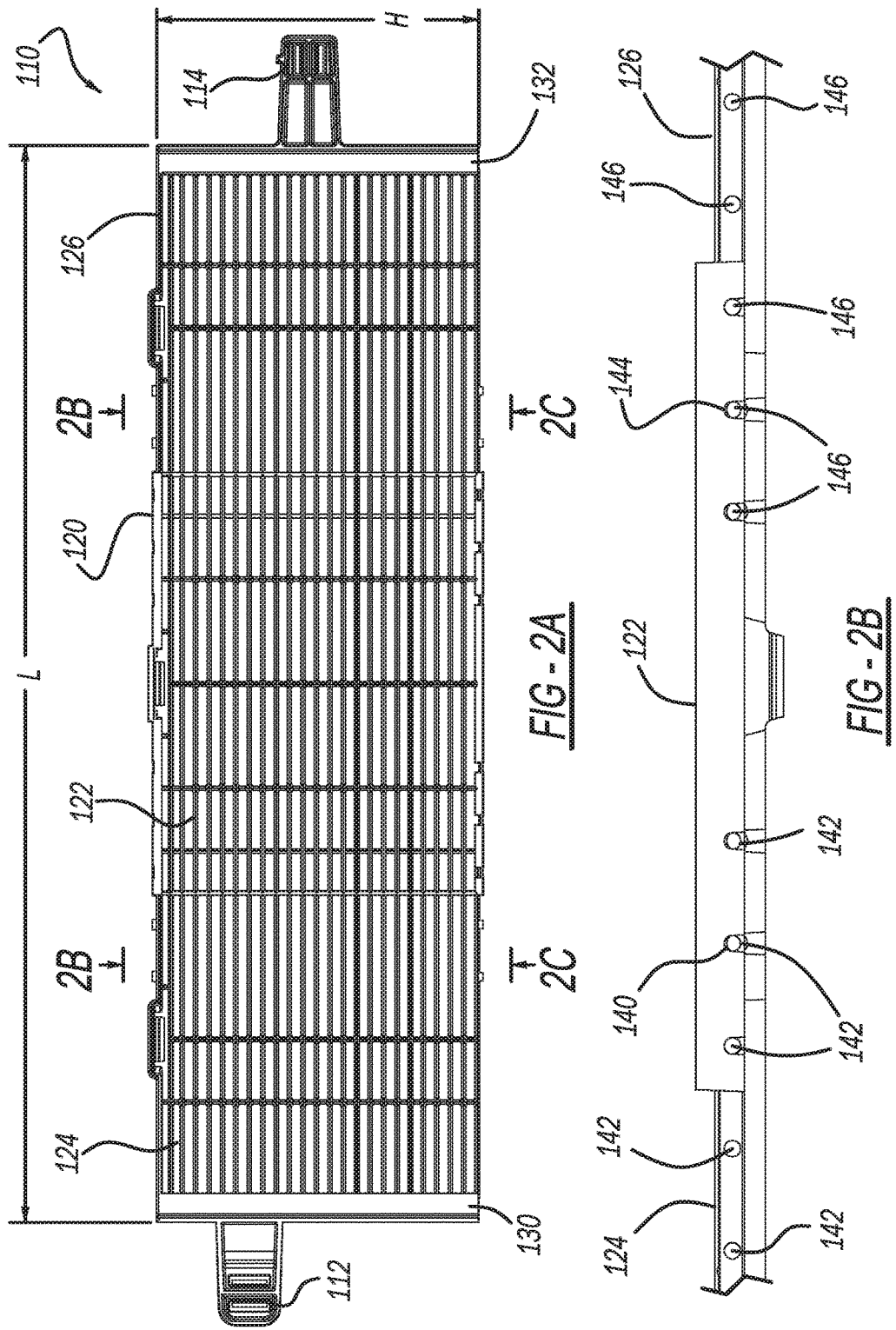

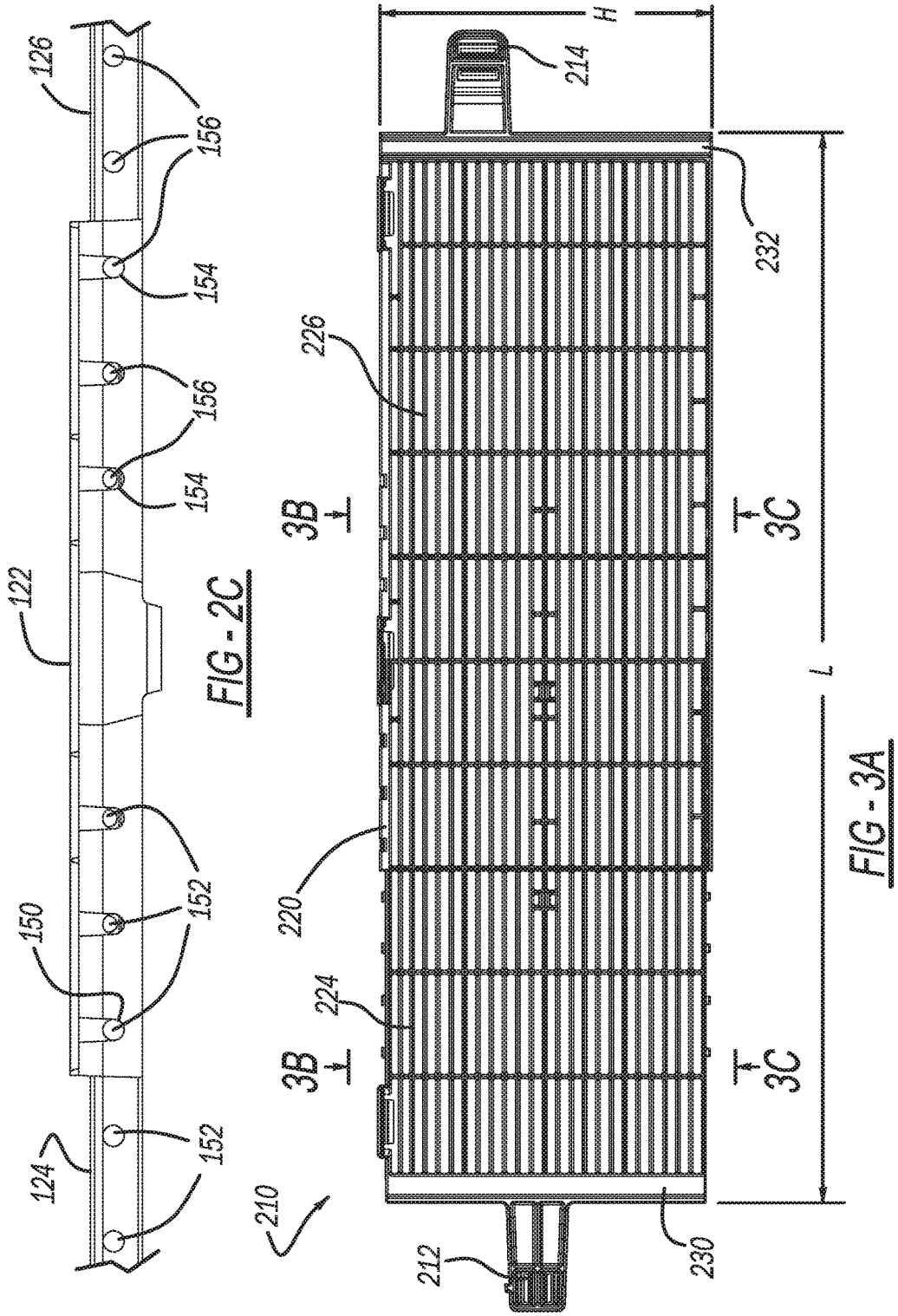

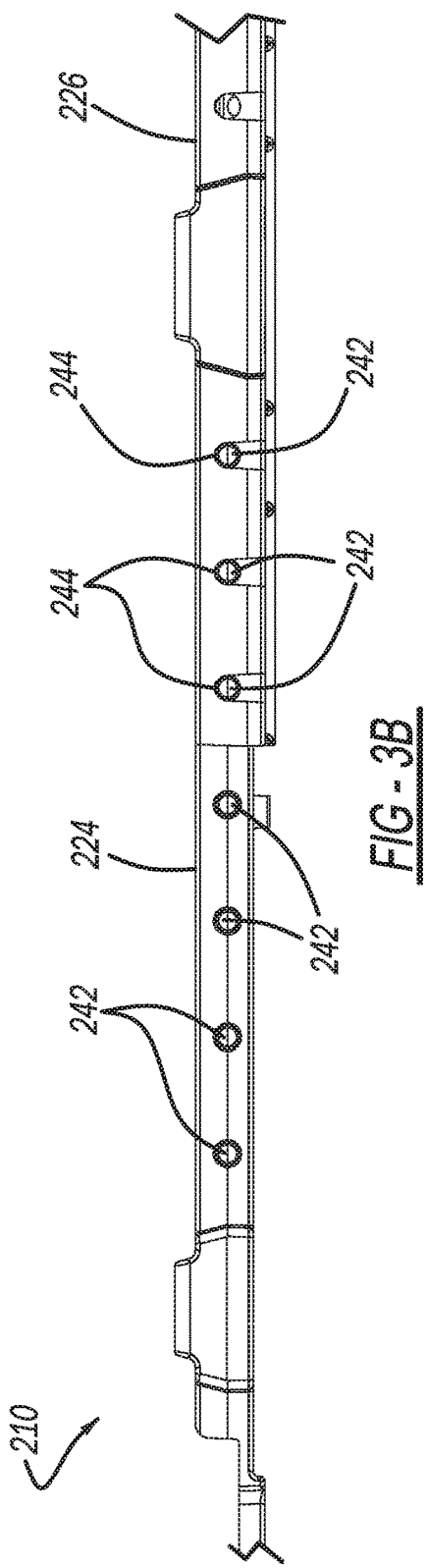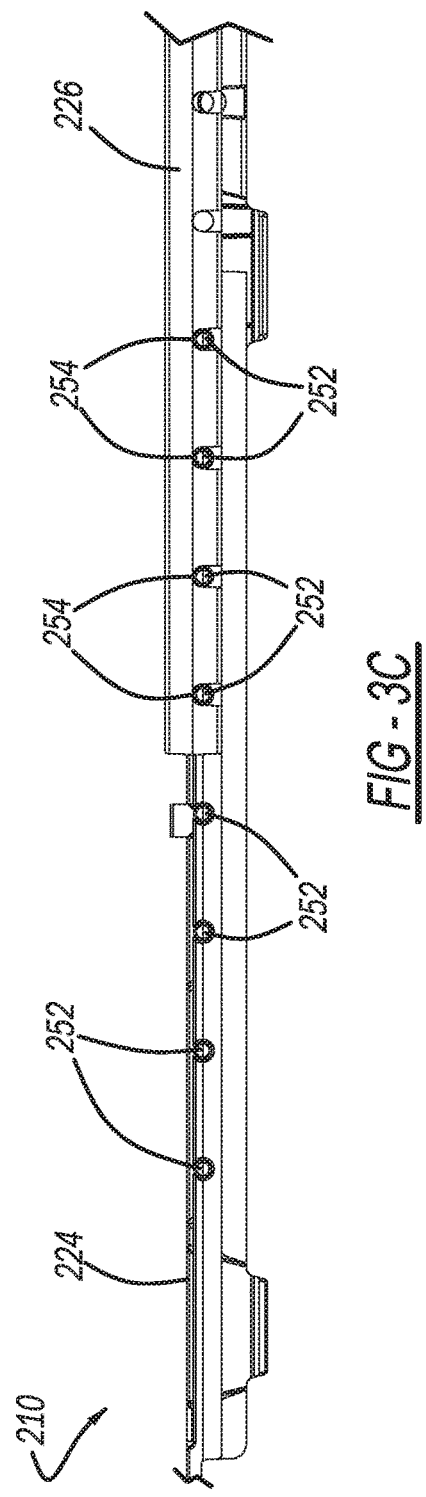

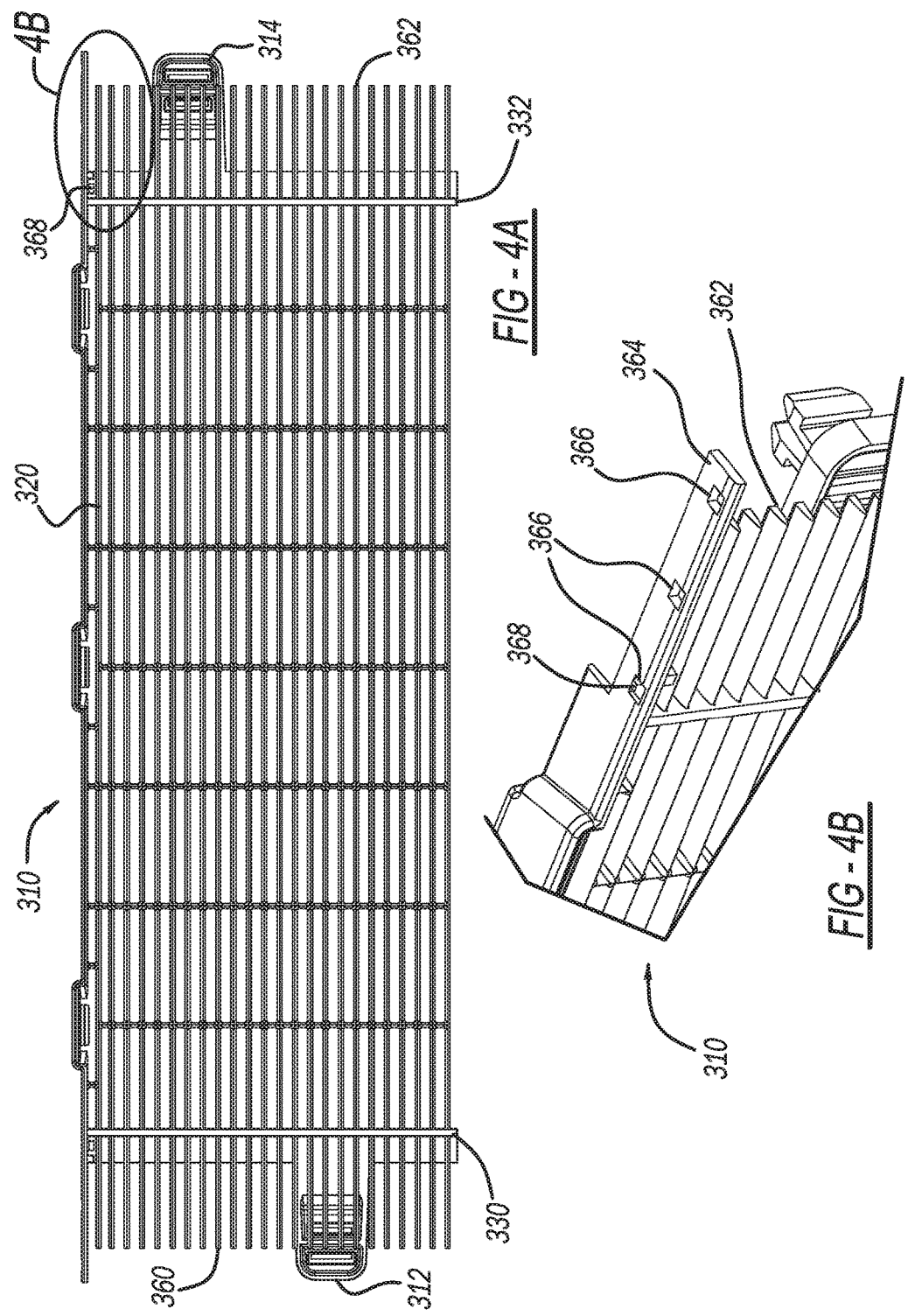

RADIATOR CORE STONE GUARD

FIELD

The present disclosure relates to a stone guard for a radiator.

BACKGROUND

This section provides background information related to the present disclosure, which is not necessarily prior art.

Current radiator stone guards are limited in that they are sized to fit a radiator of one particular size. A plurality of differently sized stone guards must therefore be manufactured to fit radiators of different sizes. This requires additional tooling, which increases costs and manufacturing times. For example, for current radiator stone guards the tool lead time may be as long as 24 weeks. A radiator stone guard that can fit radiators of various different sizes would therefore be desirable. The present disclosure advantageously includes radiator stone guards that can fit radiators of various different sizes, as described in detail herein. One skilled in the art will appreciate that the stone guards according to the present disclosure provide numerous additional advantages and unexpected results as well.

SUMMARY

This section provides a general summary of the disclosure, and is not a comprehensive disclosure of its full scope or all of its features.

The present disclosure includes a stone guard for protecting a radiator core of a radiator. The stone guard includes a grate, a first mount, and a second mount. The first mount is at a first end of the grate for mounting the stone guard to the radiator. The second mount is at a second end of the grate for mounting the stone guard to the radiator. A distance between the first mount and the second mount is variable to fit the stone guard to the radiator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 1:
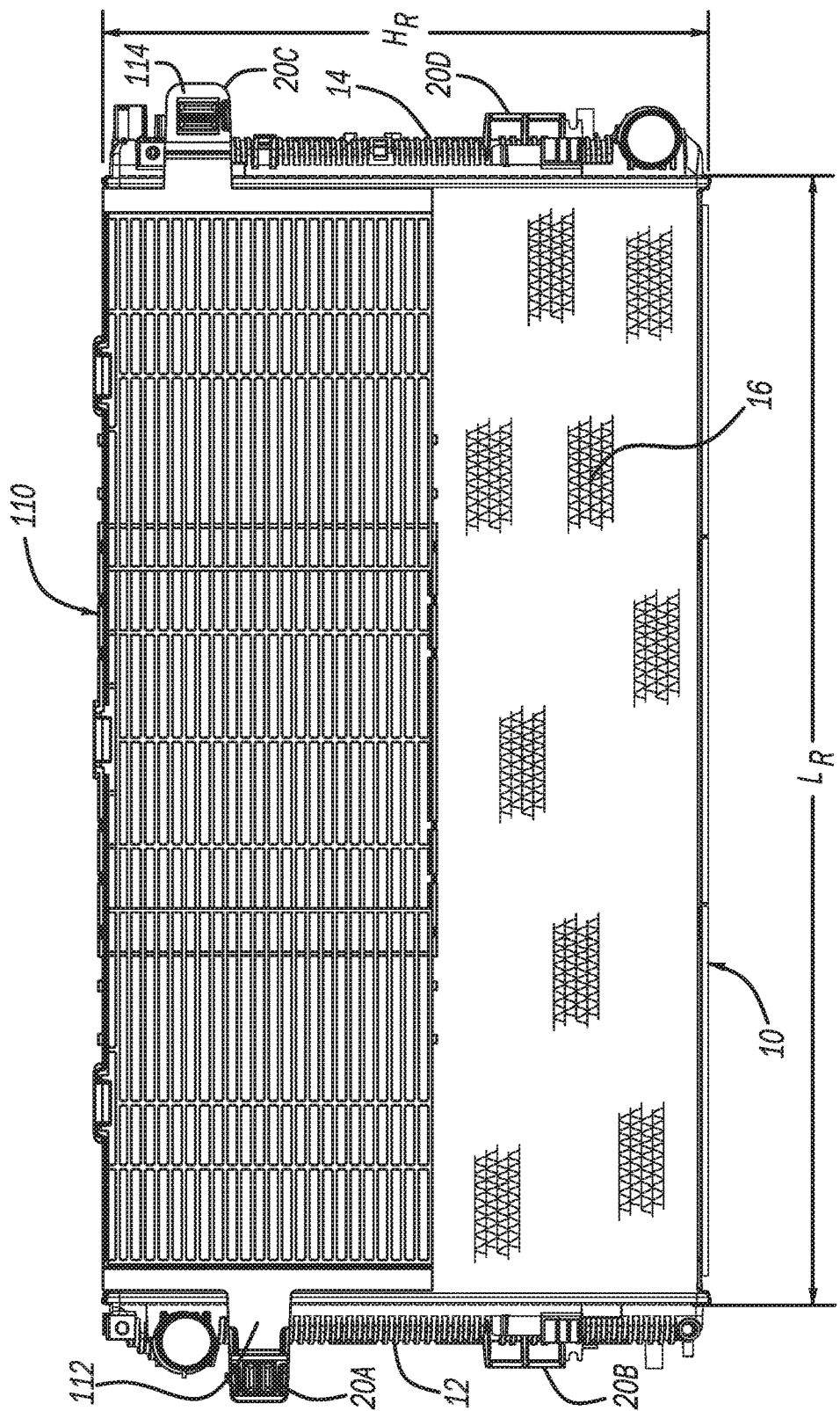
Figure 5A:
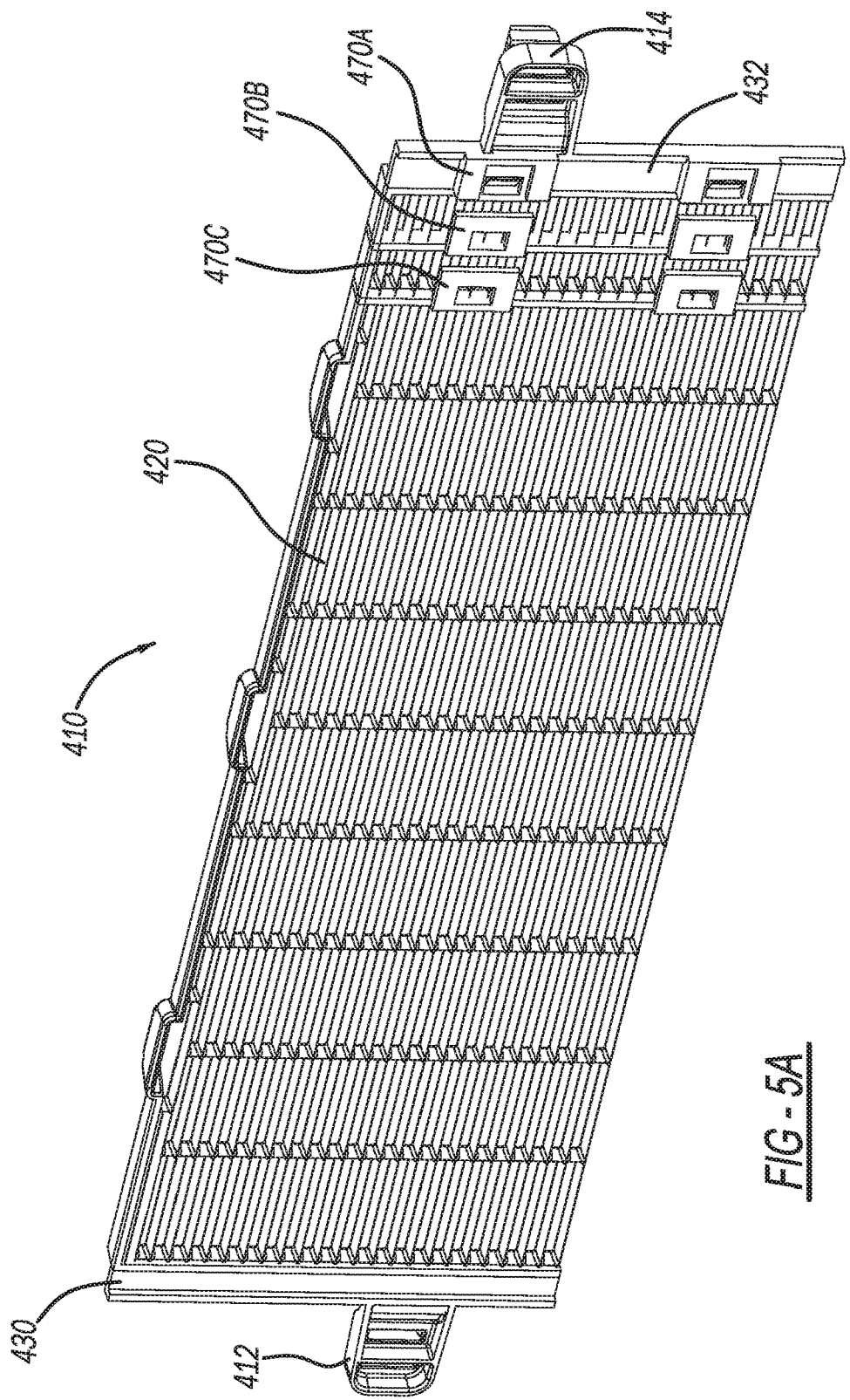
Figure 5B:
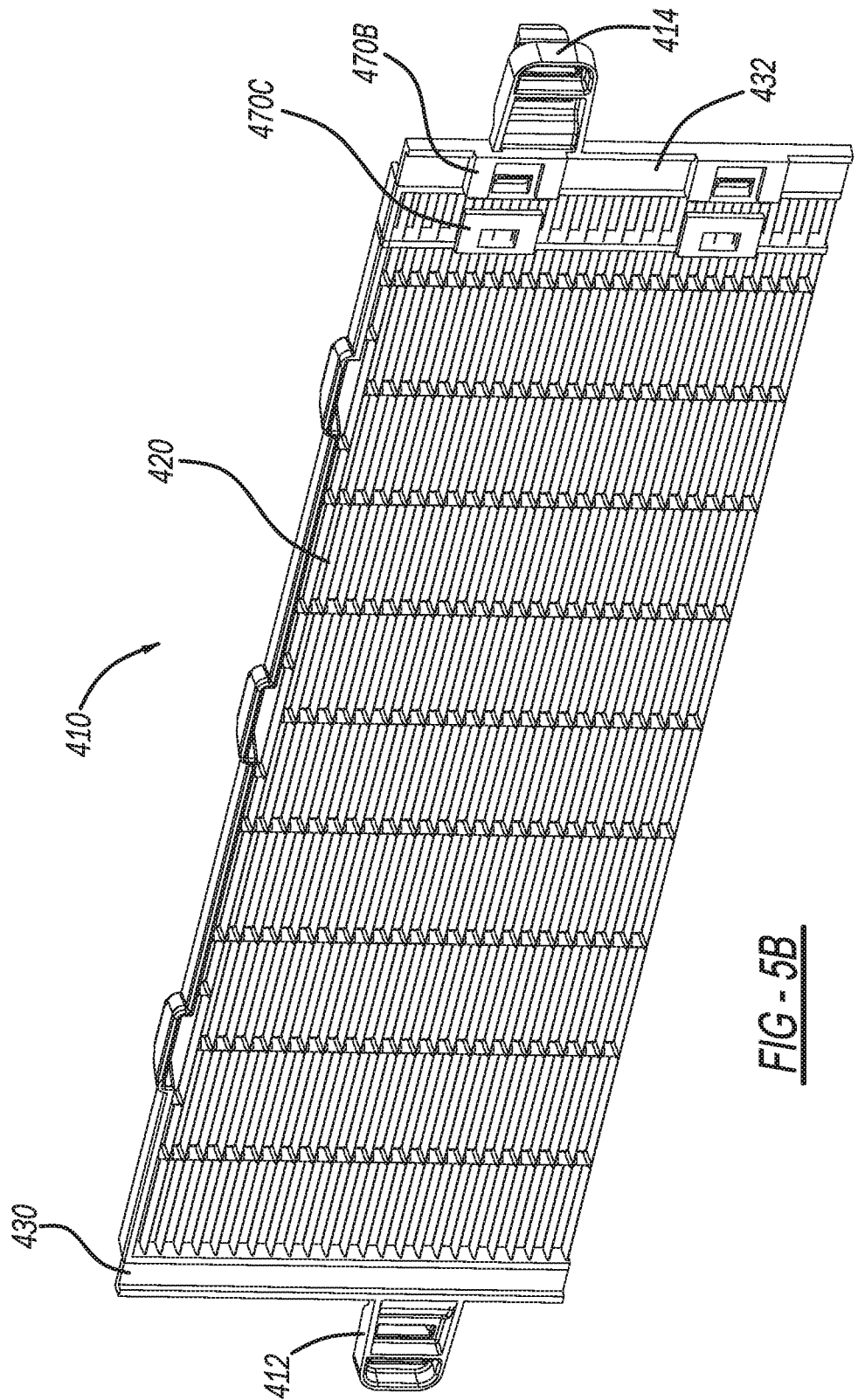
Figure 6:
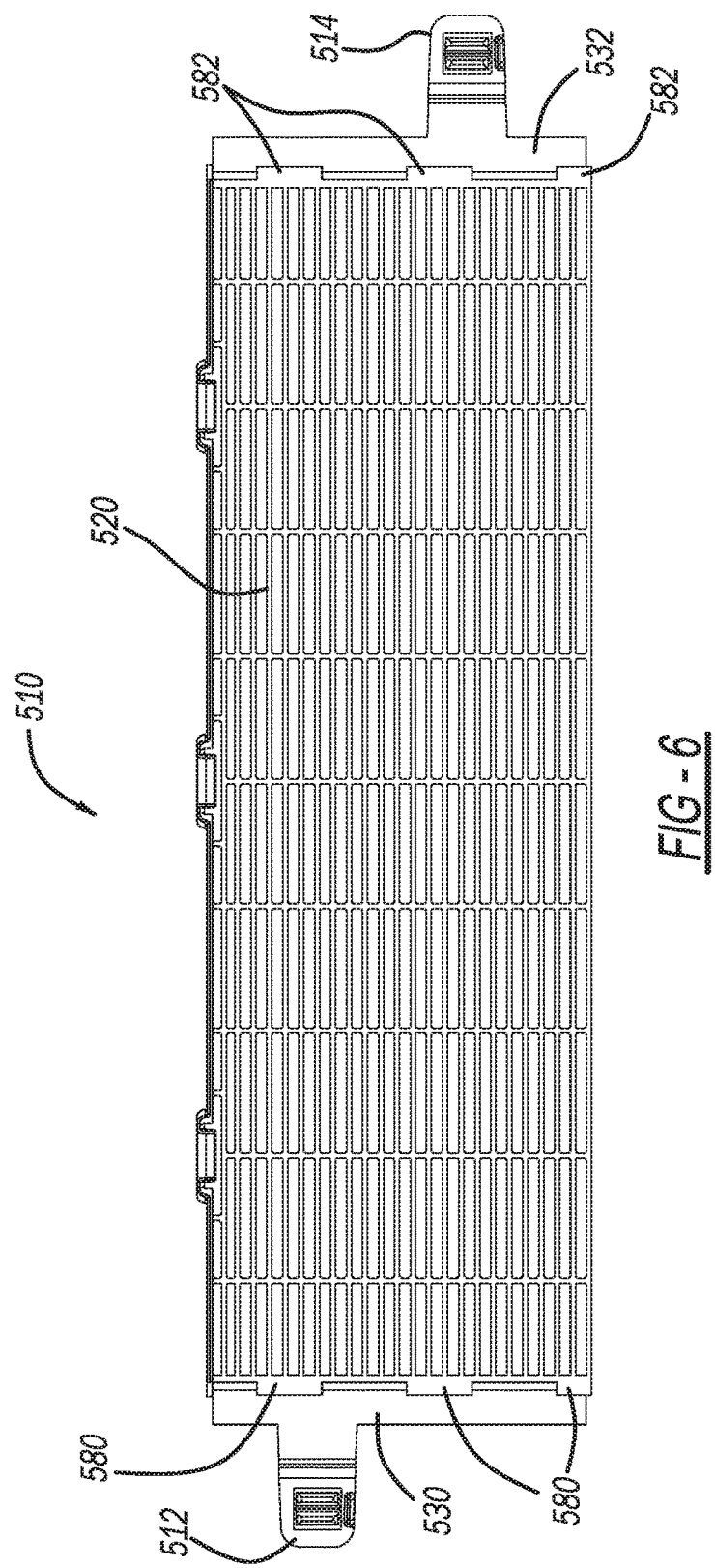

FIG. 1 illustrates a radiator with a stone guard in accordance with the present disclosure coupled thereto;

FIG. 2A is a front view of the stone guard of FIG. 1;
FIG. 2B is a top view of the stone guard of FIG. 2A;
FIG. 2C is a bottom view of the stone guard of FIG. 2A;
FIG. 3A is a front view of another stone guard in accordance with the present disclosure;
FIG. 3B is a top view of the stone guard of FIG. 3A;
FIG. 3C is a bottom view of the stone guard of FIG. 3A;
FIG. 4A is a front view of another stone guard in accordance with the present disclosure;
FIG. 4B illustrates area 4B of FIG. 4A;
FIG. 5A is a front view of an additional stone guard in accordance with the present disclosure, the stone guard having a first distance between radiator mounting members;
FIG. 5B is a front view of the stone guard of FIG. 5A having a second distance between radiator mounting members that is shorter than the first distance; and
FIG. 6 illustrates still another stone guard in accordance with the present disclosure.

Corresponding reference numerals indicate corresponding parts throughout the several views of the drawings.

DETAILED DESCRIPTION

Example embodiments will now be described more fully with reference to the accompanying drawings.

FIG. 1 illustrates a stone guard 110 in accordance with the present disclosure for protecting a radiator 10 from being damaged, such as by stones or other objects. The radiator 10 can be any suitable radiator, such as a radiator of a plug-in electric hybrid vehicle. The vehicle may be any suitable vehicle, such as any suitable passenger vehicle, mass transit vehicle, utility vehicle, commercial vehicle, recreational vehicle, construction equipment/vehicle, military vehicle/equipment, etc.

The radiator 10 generally includes a first tank 12 and a second tank 14. Between the first tank 12 and the second tank 14 is a radiator core 16. The radiator 10 is mounted at any suitable position of the vehicle, such as near a front thereof (near a front bumper of the vehicle, for example). The radiator 10 is mounted in any suitable manner, such as by way of fasteners extending through radiator mounts 20A, 20B, 20C, and 20D to the mounting location of the vehicle.

The stone guard 110 is mounted to the radiator 10 in any suitable manner, such as by way of stone guard mounts 112 and 114. The stone guard mounts 112 and 114 may be used to mount the stone guard 110 at the first tank 12 and the second tank 14 with any suitable fastener, for example. The stone guard mounts 112 and 114 may be mounted to any other suitable location as well. In the example of FIG. 1, the stone guard 110 extends across only an upper half of the radiator core 16 because the lower half of the radiator core 16 is obstructed by surrounding portions of the vehicle, thus protecting the lower portion of the radiator core 16 from being damaged, such as by stones. The stone guard 110 may alternatively extend downward to cover the entire radiator core 16.

With additional reference to FIGS. 2A, 2B, and 2C, the stone guard 110 will now be described in additional detail. The stone guard 110 includes a grate 120, which is generally impermeable to most stones. The grate 120 includes a center grate 122, a first side grate 124 connected to a first side of the center grate 122, and a second side grate 126 connected to a second side of the center grate 122. The stone guard mount 112 is included with a first connector 130, which is connected to (or integral with) the first side grate 124. The stone guard mount 114 is included with a second connector 132, which is connected to (or integral with) the second side grate 126.

The stone guard 110 has a length L, which is perpendicular to a height H. The length L of the stone guard 110 (and the distance between stone guard mounts 112 and 114) may be varied to accommodate radiators 10 having different radiator lengths $L_R$ (see FIG. 1). One skilled in the art will appreciate that the teachings of the present disclosure may be adapted to vary the height H of the stone guard 110 and the other stone guards described herein (such as the stone guard 210) to accommodate radiators having different radiator heights $H_R$ (see FIG. 1).

With reference to FIG. 2B, the stone guard 110 includes a plurality of knobs 142 extending from a top of the first side grate 124, and a plurality of knobs 146 extending from a top of the second side grate 126. The center grate 122 overlaps the first side grate 124 and the second side grate 126. Receptacles 140 are defined by the center grate 122, and are sized, shaped, and positioned to receive the knobs 142 of the first side grate 124. Receptacles 144 are defined by the center grate 122, and are sized, shaped, and positioned to receive the knobs 146 of the second side grate 126. With reference to FIG. 2C, the center grate 122 defines receptacles 150 at a bottom thereof, which are sized, shaped, and positioned to receive knobs 152 extending from a lower surface of the first side grate 124. The center grate 122 further defines receptacles 154 at a bottom thereof, which are sized, shaped, and positioned to receive knobs 156 extending from a lower surface of the second side grate 126.

The length L of the stone guard 110 (and the distance between mounts 112 and 114) may advantageously be varied to allow the stone guard 110 to fit various radiators 10 having different radiator lengths $L_R$. Specifically, each one of the first side grate 124 and the second side grate 126 may be slid into and out of the center grate 122, and locked at a desired position through interaction between the knobs 142 and the receptacles 140 (for locking the first side grate 124 to the center grate 122), and through interaction between the knobs 146 and the receptacles 144 (to lock the second side grate 126 to the center grate 120).

With reference to FIGS. 3A, 3B, and 3C, another stone guard in accordance with the present disclosure is illustrated at reference numeral 210. The stone guard 210 includes many similarities with respect to the stone guard 110, and thus features of the stone guard 210 that are similar to, or the same as, the stone guard 110 are designated in FIGS. 3A, 3B, and 3C with the same reference numerals of the stone guard 110, but increased by 100. The description of these similar/same features set forth above with respect to the stone guard 110 also applies to the stone guard 210 unless the following description of the stone guard 210 states otherwise.

The stone guard 210 includes a grate 220 having a first side grate 224 and a second side grate 226. At a top of the stone guard 210, the first and second side grates 224 and 226 cooperate through interaction between knobs 242 of the first side grate 224, and receptacles 244 defined by the second side grate 226. Similarly, at the bottom of the stone guard 210 the first and second side grates 224 and 226 cooperate through interaction between knobs 252 of the first side grate 224 and receptacles 254 defined by the second side grate 226. The first side grate 224 is seated within the second side grate 226, and thus the length L of the stone guard 210 (as well as the distance between mounts 212 and 214) may be varied by retracting the first side grate 224 further into the second side grate 226 and extending the first side grate 224 further out from within the second side grate 226. In this manner, the length of the stone guard 210 may be varied, and the distance between the stone guards mounts 212 and 214 increased or decreased to accommodate various different radiator lengths $L_R$.

FIGS. 4A and 4B illustrate an additional stone guard in accordance with the present disclosure at reference numeral 310. The stone guard 310 includes many similarities with respect to the stone guard 110, and thus features of the stone guard 310 that are similar to, or the same as, the stone guard 110 are designated in FIGS. 4A and 4B with the same reference numerals of the stone guard 110, but increased to the 300's. The description of these similar/same features set forth above with respect to the stone guard 110 also applies to the stone guard 310 unless the following description of the stone guard 310 states otherwise.

The stone guard 310 includes a grate 320 having first end grates 360 and second end grates 362. Seated on the first end grates 360 is a first connector 330 including first mount 312. Seated on the second end grates 362 is a second connector 332 including mount 314. The mounts 312 and 314 are for coupling the stone guard 310 to the radiator 10 in any suitable manner. To accommodate radiators 10 having different radiator lengths $L_R$, the first connector 330 may be slid along the length of the first end grates 360, and/or the second connector 332 may be slid along the lengths of the second end grates 362 until a desired distance between the mounts 312 and 314 suitable for accommodating a particular radiator length $L_R$ is achieved.

The first and second connectors 330 and 332 can be locked along the lengths of the first end grates 360 and the second end grates 362 respectively in any suitable manner. For example and as illustrated in FIG. 4B, the top grate 364 of the second end grates 362 defines receptacles 366. The second connector 332 includes a knob 368, which is sized and shaped to be received within any one of the receptacles 366 to lock the second connector 332 along the length of the second end grates 362. The first connector 330 may be locked along the length of the first end grates 360 in a similar manner. Although the stone guard 310 is illustrated as having the movable first connector 330 and the movable second connector 332, either one of the connectors 330, 332 may be stationary, such as the connectors 130, 132, 230, 232 are.

FIGS. 5A and 5B illustrate an additional stone guard in accordance with the present disclosure at reference numeral 410. The stone guard 410 includes many similarities with respect to the stone guard 110, and thus features of the stone guard 410 that are similar to, or the same as, the stone guard 110 are designated in FIGS. 5A and 5B with the same reference numerals of the stone guard 110, but increased to the 400's. The description of these similar/same features set forth above with respect to the stone guard 110 also applies to the stone guard 410 unless the following description of the stone guard 410 states otherwise.

The stone guard 410 includes a protective grate 420, which may be mounted to any suitable radiator 10 by way of stone guard mounts 412 and 414. The grate 420 includes a plurality of bases to which the second connector 432 may be mounted to. Specifically, mounted to the grate 420 is a first base 470A, a second base 470B, and a third base 470C. Each one of the bases 470A, 470B, and 470C is spaced apart from one another. In the example illustrated, the first base 470 is arranged at an end of the grate 420, and the second base 470B and the third base 470C are progressively positioned inward from the first base 470A. The second connector 432 may be mounted to any one of the first base 470A, the second base 470B, or the third base 470C to vary the distance between the mount 414 and the mount 412 to permit the stone guard 410 to be fastened to any suitable radiator 10 having any suitable radiator length $L_R$. For example and as illustrated in FIG. 5A, the second connector 432 is coupled to the first base 470A to accommodate a first radiator length $L_R$, and in the example of FIG. 5B the second connector 432 is coupled to the second base 470B to accommodate a second and shorter radiator length $L_R$. Although the example of FIGS. 5A and 5B only illustrates the bases 470A, 470B, and 470C at the end of the grate 420 for the mount 414, first connector 430 including mount 412 may be mounted to bases spaced apart at the other end of the grate 420 in a similar manner. The bases 470A, 470B, and 470C may also be arranged to accommodate radiators 10 having different heights $H_R$ as one skilled in the art will appreciate.

With reference to FIG. 6, an additional stone guard in accordance with the present disclosure is illustrated at reference numeral 510. The stone guard 510 includes many similarities with respect to the stone guard 110, and thus features of the stone guard 510 that are similar to, or the same as, the stone guard 110 are designated in FIG. 6 with the same reference numerals of the stone guard 110, but increased to the 500's. The description of these similar/same features set forth above with respect to the stone guard 110 also applies to the stone guard 510 unless the following description of the stone guard 510 states otherwise.

The stone guard 510 includes a grate 520 having a first receptor 580 and a second receptor 582 at opposite sides thereof. The first receptor 580 is configured to cooperate with a first modular connector 530 including radiator mount 512. The second receptor 582 is configured to cooperate with a second modular connector 532 having a radiator amount 514. The first receptor 580 is also configured to cooperate with any other suitable modular connector, such as a module connector having a radiator mount configured differently from the radiator mount 512 to facilitate mounting of the stone guard 510 to a particular radiator configuration. Similarly, the second receptor 582 is configured to mount the second modular connector 532 with the radiator mount 514, or any other suitable modular connector having any suitable radiator mount 514. For example, in place of the first modular connector 530 mounted to the first receptor 580, and/or in place of the second modular connector 532 mounted to the second receptor 582, may be any suitable alternate connector having an alternate radiator mount suitable for mounting the stone guard 510 to a specific radiator 10 having a specific length $L_R$ (or height $H_R$). For example, the radiator mounts 512/514 may be located at a different position and/or configured differently. Any of the other stone guards 110, 210, 310, and 410 may include the receptors 580 and 582 to permit cooperation with modular connectors, such as the first and second module connectors 530 and 532, or any other modular connector to facilitate coupling of the stone guards 110, 210, 310, 410 to a particular radiator 10.

The present disclosure thus advantageously provides for stone guards 110, 210, 310, 410, and 510 that allow the distance between radiator mounts thereof to be varied, and the lengths of the stone guards to be varied (and may be configured to have the heights varied in a similar manner as one skilled in the art will appreciate) to allow the stone guards to be secured to radiators having various different lengths $L_R$ (or heights $H_R$). The present disclosure thus eliminates the need for separate tooling and manufacturing of different stone guards having specific lengths (or heights). The present disclosure advantageously reduces manufacturing costs and manufacturing times.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A stone guard for protecting a radiator core of a radiator, the stone guard comprising:
   a grate;
   a first mount at a first end of the grate for mounting the stone guard to the radiator; and
   a second mount at a second end of the grate for mounting the stone guard to the radiator;
   wherein a distance between the first mount and the second mount is variable to fit the stone guard to the radiator;
   wherein the grate includes a first portion and a second portion that are movable relative to one another to vary at least one of a length and a height of the stone guard; and
   wherein the first portion includes a plurality of receptacles and the second portion includes a plurality of knobs that are sized and shaped to be received within the plurality of receptacles to lock the first portion and the second portion together, the plurality of knobs extend from an upper surface of the grate in a direction parallel to a height of the grate.

2. The stone guard of claim 1, wherein at least one of the first mount and the second mount is movable along the grate to vary the distance between the first mount and the second mount.

3. The stone guard of claim 2, wherein at least one of the first mount and the second mount is movable along end portions of the grate.

4. The stone guard of claim 3, wherein a top grate of the grate includes a plurality of receptacles to receive first knobs of a first connector including the first mount, and knobs of a second connector including the second mount.

5. The stone guard of claim 1, further comprising a first base mounted to the grate and a second base mounted to the grate spaced apart at different positions along the grate;
   wherein a connector including the first mount is coupleable to the first base or the second base to vary the distance between the first mount and the second mount.

6. The stone guard of claim 1, wherein:
   the first mount is included with a first modular connector removably coupleable to a first receptor at the first end of the grate; and
   the second mount is included with a second modular connector removably coupleable to a second receptor at the second end of the grate.

7. A stone guard for protecting a radiator core of a radiator, the stone guard comprising:
   a center grate, a first side grate coupled to a first side of the center grate, and a second side grate coupled to a second side of the center grate;
   wherein at least one of the first side grate and the second side grate is movable relative to the center grate to vary at least one of a length and a height of the stone guard; and
   wherein each one of the first side grate and the second side grate includes a plurality of knobs sized and shaped to cooperate with receptacles defined by the center grate to lock the first side grate and the second side grate at various positions relative to the center grate, the plurality of knobs extend from an upper surface of the first side grate and the second side grate in a direction parallel to a height of the first side grate and a height of the second side grate.

8. The stone guard of claim 7, wherein the center grate overlaps each one of the first side grate and the second side grate.

9. The stone guard of claim 7, wherein:
   the first side grate includes a first mount at an end thereof opposite to the center grate for mounting the stone guard to the radiator; and
   the second side grate includes a second mount at an end thereof opposite to the center grate for mounting the stone guard to the radiator.

10. The stone guard of claim 9, wherein:
    the first mount is included with a first modular connector, and the first side grate includes a first receptor for removably coupling the first modular connector to the first side grate; and
    the second mount is included with a second modular connector, and the second side grate includes a second receptor for removably coupling the second modular connector to the second side grate.

11. The stone guard of claim 7, wherein the first side grate includes a plurality of first bases spaced apart at different positions along a length of the first side grate, each one of the plurality of first bases is configured to couple with a first connector including a first mount for mounting the first side grate to the radiator.

12. The stone guard of claim 11, wherein the second side grate includes a plurality of second bases spaced apart at different positions along a length of the second side grate, each one of the plurality of second bases is configured to couple with a second connector including a second mount for mounting the second side grate to the radiator.

* * * * *